US006542562B1

(12) United States Patent
Östberg et al.

(10) Patent No.: US 6,542,562 B1
(45) Date of Patent: Apr. 1, 2003

(54) APPROXIMATED MMSE-BASED CHANNEL ESTIMATOR IN A MOBILE COMMUNICATION SYSTEM

(75) Inventors: Christer Östberg, Staffanstorp (SE); Bengt Lindoff, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/247,067

(22) Filed: Feb. 9, 1999

(51) Int. Cl.[7] ................................................. H04B 1/10
(52) U.S. Cl. ...................... 375/350; 375/148; 375/229; 375/231; 375/316
(58) Field of Search ................................ 375/224, 229, 375/267, 148, 344, 232, 231, 316, 343, 350; 370/335; 708/319

(56) References Cited

U.S. PATENT DOCUMENTS

| | | | | |
|---|---|---|---|---|
| 5,414,734 A | * | 5/1995 | Marchetto et al. | 375/267 |
| 5,717,619 A | * | 2/1998 | Spurbeck et al. | 708/319 |
| 5,799,011 A | * | 8/1998 | LaRosa et al. | 370/335 |
| 6,002,716 A | * | 12/1999 | Meyer et al. | 375/231 |

FOREIGN PATENT DOCUMENTS

EP 0605955 A2 7/1994

OTHER PUBLICATIONS

Scharf, Louis L.: "Statistical Signal Processing—Detection, Estimation, and Time Series Analysis", Addison-Wesley Publishing Company, Reading, Mass., 1991.

William C. Jakes, Jr., "Microwave Mobile Communications," John Wiley & Sons, Inc., 1974, Title page, Copyright page, and Table of Contents pages only.

Edward J. Wegman, et al., "Statistical Signal Processing," Marcel Dekker, Inc., 1984, Title page, Copyright page, and Table of Contents pages only.

John G. Proakis, "Digital Communications," McGraw–Hill, Inc., 1983, Title page, Copyright page, and Table of Contents pages only.

Koji Ohno, et al. "Wideband Coherent DS–CDMA," Proceedings of the Vehicular Technology Conference, Chicago, Jul. 25–28, 1995, vol. 2, No. Conf. 45, Jul. 25, 1995, pp. 779–783.

C. D'Amours, et al., "RAKE Receiver Structures for Differential and Pilot Symbol–Assisted Detection of DS–CDMA Signals in Frequency–Selective Rayleigh Fading Channels," Proceedings of the Global Telecommunications Conference, Houston, Nov. 29–Dec. 2, 1993, vol. 3, Nov. 29, 1993, pp. 1798–1802.

* cited by examiner

Primary Examiner—Shuwang Liu
(74) Attorney, Agent, or Firm—Burns, Doane, Swecker & Mathis, L.L.P.

(57) ABSTRACT

Channel estimation is performed in a mobile communications system. In order to reduce the computational load, and thereby decrease power consumption, a polynomial expression is used to approximate a Minimum Mean Squared Error (MMSE) based channel estimator with respect to Doppler and SIR variations. A lookup table may be used to supply coefficients for the polynomial expression. In another aspect of the invention, coefficients for the polynomial expression may, themselves, be approximated by a second polynomial expression.

16 Claims, 7 Drawing Sheets

US 6,542,562 B1

APPROXIMATED MMSE-BASED CHANNEL ESTIMATOR IN A MOBILE COMMUNICATION SYSTEM

BACKGROUND

The present invention relates to channel estimation in mobile communication systems, and more particularly to methods and apparatuses that perform channel estimation with lower computational intensity.

Mobile radio telephony is characterized, among other things, by multipath propagation of the radio signal that is transmitted between base stations (BSs) and mobile stations (MSs). Because different rays of the transmitted signal may take different paths before arriving at a receiver's antenna, some rays are received later than others by the receiver. The resulting received signal, then, includes one or more echoes of the transmitted signal. When the information transmitted in the signal consists of digital symbols, these echoes are referred to as Inter-Symbol Interference (ISI). ISI detrimentally affects a receivers ability to determine the informational content of the received signal.

In order to reduce or eliminate ISI in a received signal, it is known to use equalizers in the receiver. This will be further described with reference to systems that utilize Code Division Multiple Access (CDMA) techniques to distinguish between the signals associated with different users. It will be recognized, however, that CDMA is but one of many possible examples (e.g., Time Division Multiple Access, or "TDMA" being another such example) of radio systems that employ a RAKE receiver or equalizers to address the problem of multipath propagation.

The basic idea in a CDMA system is to separate different users, base stations, and services by means of unique spreading sequences/codes. In one type of CDMA system, the informational data stream to be transmitted is impressed upon a much higher rate data stream known as a signature or spreading sequence. Typically, the signature sequence data are binary, thereby providing a bit stream. One way to generate this signature sequence is with a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

A plurality of spread information signals modulate a radio frequency carrier, for example by binary phase shift keying (BPSK), and are jointly received as a composite signal at the receiver. Each of the spread signals overlaps all of the other spread signals, as well as noise-related signals, in both frequency and time. If the receiver is authorized, then the composite signal is correlated with one of the unique signature sequences, and the corresponding information signal can be isolated and despread. If quadrature phase shift keying (QPSK) modulation is used, then the signature sequence may consist of complex numbers (having real and imaginary parts), where the real and imaginary parts are used to modulate respective ones of two carriers at the same frequency, but ninety degrees out of phase with respect to one another.

Traditionally, a signature sequence is used to represent one bit of information. Receiving the transmitted sequence or its complement indicates whether the information bit is a +1 or −1, sometimes denoted "0" or "1". The signature sequence usually comprises N bits, and each bit of the signature sequence is called a "chip". The entire N-chip sequence, or its complement, is referred to as a transmitted symbol. The conventional receiver, such as a RAKE receiver, correlates the received signal with the complex conjugate of the known signature sequence to produce a correlation value. When a large positive correlation results, a "0" is detected; when a large negative correlation results, a "1" is detected.

It will be understood, then, that the rate of the spreading code (usually referred to as the chip rate) is larger than the information symbol rate. The code rate divided by the information symbol rate is referred to as the spreading factor ($S_f$). In a system with the transmission of several users being separated by different spreading codes, the code that separates these users is referred to as the long code. By correlating the composite signal with the conjugate of one of the used codes in a receiver, the corresponding user information is recreated while signals related to other users are experienced as noise.

In order to overcome the multipath characteristics in a mobile radio channel, the RAKE receiver and the ray searcher are two essential units for the Wideband Code Division Multiple Access (W-CDMA) technology being standardized under the name IMT2000. (See, e.g., IMT-2000 Study Committee Air-interface WG, SWG2, "Volume 3 Specifications of Air-interface for 3G Mobile System", Ver. 0–3.1, December 1997.) An exemplary RAKE receiver is illustrated in FIG. 1. Briefly, the fundamental idea with the RAKE is to synchronize each of the relevant multipath components of the input radio signal to a rather simple receiver. (See, e.g., J. G. Proakis, *Digital Communications*, McGraw-Hill, 1983). The simple receiver is often referred to as an arrangement of RAKE fingers. Six RAKE fingers 101 are depicted in the exemplary receiver of FIG. 1. The different multipath components are assumed to be reasonably uncorrelated. When the assumption is valid and a sufficient number of fingers are used, maximum ratio combining of the fingers results in a quite simple receiver technology with good performance.

Channel Estimation Overview

The overall frame structure for the physical channels of the exemplary W-CDMA scheme are depicted in FIG. 2. The transmitted base band signal, $s_{i,j,k}$, is given by $$s_{i,j,k} = c_{i,j,k} \cdot u_{j,k} \quad (1)$$

where $c_{i,j,k}$ is the complex spreading sequence and $u_{j,k}$ represents the jth complex symbol in slot k. The notation above gives the signals of interest for chip i in symbol j and slot k, where i=0,1, . . . $S_f$−1 and j=0,1, . . . $N_s$−1. The spreading factor is given by $S_f$ and $N_s$ is the number of symbols per slot. For the W-CDMA system, the chip rate is 4.096e6 chip per second (cbps) and $$N_s = \frac{2560}{S_f}. \quad (2)$$

The long code is cyclically repeated every frame. In order to get a coherent receiver, the channel corruption $\hat{h}_{j,k-n_B}$ (of amplitude and phase) for each symbol j in slot k−$n_B$ needs to be estimated. Due to the different arrival times of the multipath components, the channel corruptions are correspondingly different for each multipath component. In order to perform Maximum Ratio Combining (MRC) the channel corruption needs to be estimated for each of the multipath components that is synchronized to a RAKE finger 101. The first step in the channel estimation procedure is to obtain a primary channel estimate $\bar{h}_k$ for each slot. A channel estimate, $\hat{h}_{j,k-n_B}$ for each symbol j in slot $k-n_B$ is then obtained, based on m consecutive primary channel estimates, where $m \geq n_B$. The parameter $n_B$ is the number of slots that are buffered. The distribution of the channel characteristics in the multipath components is dependent on the environment and can, for example, be Rayleigh distributed. The amplitude and phase variation of consecutive primary channel estimates depend on the one hand on the Rayleigh distribution and on the other hand on the Doppler frequency.

The principle blocks related to one exemplary finger 101 of the RAKE receiver are depicted in FIG. 3. As an overview to its operation, the RAKE finger 101 performs spreading code correlation, integration over a symbol, and estimation of the channel using a priori known pilot symbols. The channel estimate is then used to compensate for the channel distortion. The operation of the RAKE finger 101 will now be described in greater detail.

The received signal in a W-CDMA system is $$r_{i,j,k} = s_{i,j,k} \cdot h_{i,j,k} + n_{i,j,k} \qquad (3)$$

where $n_{i,j,k}$ is the interference modulated as complex valued Additive White Gaussian Noise (AWGN) with the variance $N_0$. The despread received signal is then $$r_{j,k} = \frac{1}{S_f} \cdot \sum_{i=0}^{S_f-1} c^*_{i,j,k} \cdot (c_{i,j,k} \cdot u_{j,k} \cdot h_{i,j,k} + n_{i,j,k}) \qquad (4)$$

$$r_{j,k} = u_{j,k} \cdot h_{j,k} + \tilde{n}_{j,k}.$$

In each RAKE finger 101 the received signal, which is aligned to corresponding path delay, is despread by multiplying with the conjugated code $c^*_{i,j,k}$. In the exemplary embodiment of FIG. 3, this is performed by the first multiplier 401. A first integration device 403 then performs the succeeding integration over a symbol to yield the received symbols, $r_{j,k}$, where $\tilde{n}_{j,k}$ also is considered as white Gaussian noise with variance $N_0/S_f$. The noise is correspondingly suppressed by a factor $S_f$ compared to $n_{i,j,k}$. For the W-CDMA system, the first $N_p$ symbols in each slot are a priori known pilot symbols. These $N_p$ symbols are routed, by for example a switch 405, to a second multiplier 407. The second multiplier 407 multiplies the received pilot symbols by the conjugated a priori known pilot symbols, $u_{j,k}^*$. The resultant product of this multiplication is then supplied to a second integration device 409, which generates a primary channel estimate $\bar{h}_k$ for slot k. Mathematically, this is seen as $$\bar{h}_k = \frac{1}{N_p} \cdot \sum_{j=0}^{N_p-1} u^*_{j,k} \cdot (u_{j,k} \cdot h_{j,k} + \tilde{n}_{j,k}) \qquad (5)$$

$$\bar{h}_k = \bar{h}_k + \hat{n}_k$$

For reasons similar to that described above with respect to the noise in Eq. (4) $\hat{n}_k$ is considered to be white Gaussian noise with a variance given by $N_0/(N_p \cdot S_f)$.

Consider a refined channel estimator 411 that uses multiple primary channel estimates to obtain a channel estimate $\hat{h}_{j,k-n_B}$ for symbol j in slot $k-n_B$ by means of linear combination:

$$\hat{h}_{j,k-n_B} = G_j \cdot \bar{H} N_p \prec j \leq N_s, \qquad (6)$$

where $n_B$ is the number of slots to buffer. The vector $G_j$ is the vector of m filter coefficients that are associated with the refined channel estimate for symbol j:

$$G_j = [g_{k-m}, \ldots, g_{k-1}, g_k]. \qquad (7)$$

$\bar{H}$ is the vector of the primary channel estimates from m slots $$\bar{H} = [\bar{h}_{k-m}, \ldots, \bar{h}_{k-1}, \bar{h}_k]^T. \qquad (8)$$

The filter coefficients $G_j$ minimize the mean-squared error $$E\{(h_{j,k-n_B} - G_j \cdot \bar{H})^* (h_{j,k-n_B} - G_j \cdot \bar{H})\}, \qquad (9)$$

where $E\{\ \}$ is the well-known expectation function.

This brings about that the minimum mean-squared error (MMSE) estimator of $h_{j,k-n_B}$ satisfies the condition.

$$E\{(h_{j,k-n_B} - G_j \cdot \bar{H}) \cdot \bar{H}^H\} = 0, \qquad (10)$$

where $\bar{H}^H$ denotes the Hermetian transpose of the matrix $\bar{H}$ (see Louis L. Scharf, *Statistical Signal Processing, Detection, Estimation, and Time Series Analysis*, Addison Wesley 19038, 1991). The condition could be rewritten as $$R_{h\bar{h}} - G_j \cdot R_{\bar{h}\bar{h}} = 0, \qquad (11)$$

where $R_{h\bar{h}}$ is the cross-covariance between the channel for symbol j in slot $k-n_B$ and the m primary channel estimates, and $R_{\bar{h}\bar{h}}$ is the cross co-variance between all the m primary channel estimates. The filter coefficients $G_j$ are given by $$G_j = R_{h\bar{h}} \cdot R_{\bar{h}\bar{h}}^{-1}, \qquad (12)$$

To assist with further explanations, a positioning function p(j,k) is defined as $$p(j,k) = T_s \cdot (j \cdot S_f + k \cdot N_s) j = 0, 1, \ldots N_s \qquad (13)$$

where $T_s$ is the duration of a symbol j in slot k. Also, the time-correlation, $\rho(\Delta t)$, in the channel determines how fast the channel fluctuates. If one assumes that the power spectrum density of channel $h_{j,k}$ is given by Jakes model (see W. C. Jakes, *Microwave Mobile Communications*, IEEE Press, 1974), then $$\rho(\Delta t) = J_0(2\pi f_d \Delta t), \qquad (14)$$

where $J_0(2\pi f_d \Delta t)$ is a Bessel function of the first kind and of order zero, and where $f_d$ is the Doppler frequency. By using the positioning function in the correlation function, $$R_{h\bar{h}} = |\bar{h}|^2 \cdot [\rho(p(j,k-n_B) - p(1,k-m)), \ldots, \rho(p(j,k-n_B) - p(1,k))]. \qquad (15)$$

Furthermore, $R_{\bar{h}\bar{h}}$ is given by $$R_{\bar{h}\bar{h}} = |\bar{h}|^2 \cdot \begin{bmatrix} \rho(0) + \dfrac{N_0}{|\bar{h}|^2 \cdot S_f N_p} & \ldots & \rho(p(1, k-m) - p(1,k)) \\ \ldots & \ldots & \ldots \\ \rho(p(1,k) - p(1, k-m)) & \ldots & \rho(0) + \dfrac{N_0}{|\bar{h}|^2 \cdot S_f N_p} \end{bmatrix}, \qquad (16)$$

where $|\bar{h}|^2$ is the average power of the channel and $N_0$ the average variance of the interference. The average Signal to Interference Ratio (SIR) per symbol is then defined as $$SIR = \frac{|\bar{h}|^2}{S_f \cdot N_0} \quad (17)$$

It can be seen, then, that in order for the RAKE finger 101 to function, it is necessary for the refined channel estimator 411 to determine the filter coefficients, $G_j$. However, the straightforward approach, in which the filter coefficients are calculated directly in accordance with Eq. (12), imposes a heavy computational load on the receiver. This is primarily due to the need to perform a matrix inversion as indicated in Eq. (12), coupled with the fact that the filter coefficients $G_j$ used in Eq. (6) need to be updated for each slot. Thus, there is a need for techniques and apparatuses that can determine channel estimates in a computationally less intensive manner.

SUMMARY

It is therefore an object of the present invention to provide techniques and apparatuses capable of determining channel estimates without the burdensome computational load imposed by conventional techniques.

In accordance with one aspect of the invention, the foregoing and other objects are achieved in methods and apparatuses for determining a communications channel estimate in a receiver, in which a polynomial expression is used to determine a set of approximated filter coefficients. The approximated filter coefficients are then used to determine the communications channel estimate.

In another aspect of the invention, polynomial coefficients for the polynomial expression are determined by supplying an address to a polynomial coefficient table having stored therein at least one set of polynomial coefficients. The polynomial coefficients supplied at an output of the polynomial coefficient table are then used as the polynomial coefficients for the polynomial expression.

The address may be derived at least in part from a Doppler frequency value of a received signal. In some embodiments, this may include quantizing the Doppler frequency value; and using the quantized Doppler frequency value as the address.

In still another aspect of the invention, polynomial coefficients for the polynomial expression may be determined by using a second polynomial expression to determine a set of approximated polynomial coefficients. The approximated polynomial coefficients are then used as part of the polynomial expression that is used to determine the set of approximated filter coefficients.

In yet another aspect of the invention, the polynomial expression that is used to determine the set of approximated filter coefficients is a function of a signal to interference ratio of a received signal, and of a Doppler frequency of the received signal.

BRIEF DESCRIPTION OF THE DRAWINGS

The objects and advantages of the invention will be understood by reading the following detailed description in conjunction with the drawings, in which.

DETAILED DESCRIPTION

Figure 1:
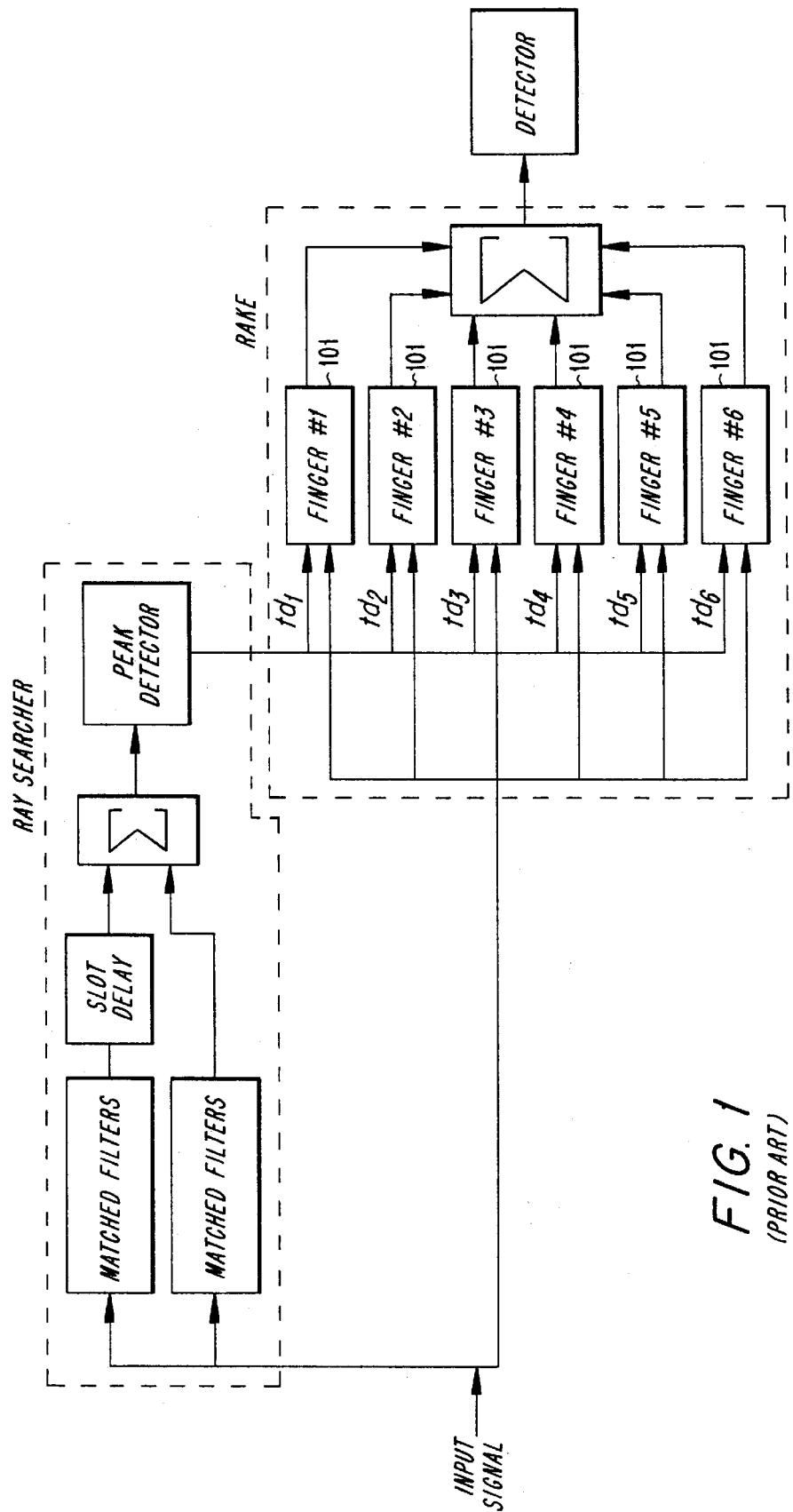
FIG. 1 is a block diagram of an exemplary RAKE receiver.
Figure 2:
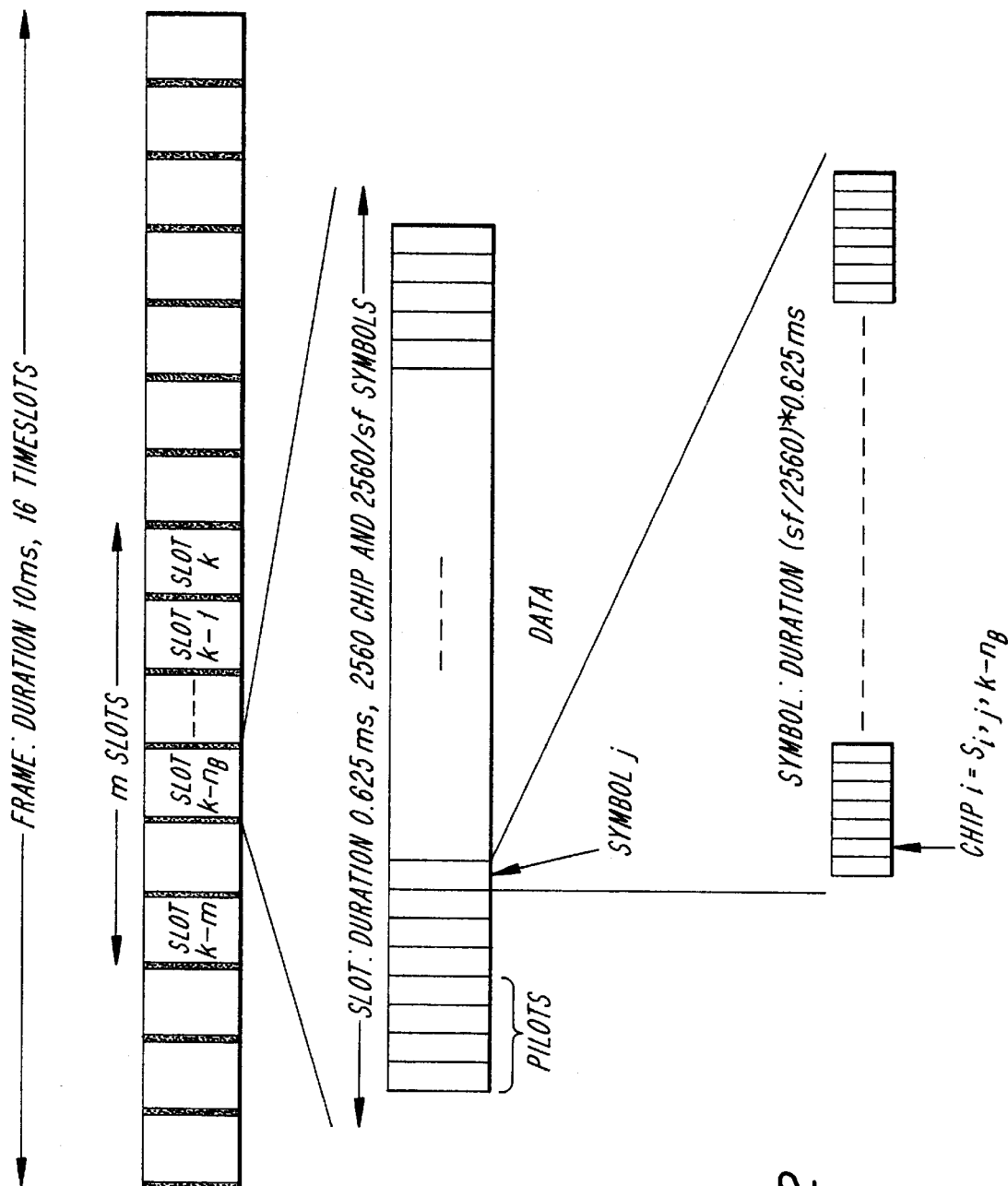
FIG. 2 is a diagram depicting the overall frame structure for the physical channels of an exemplary W-CDMA scheme.

The various features of the invention will now be described with reference to the figures, in which like parts are identified with the same reference characters.

In the following description, reference is made to various devices, units, and the like. It will be understood that any and all of such devices, units, and the like can be implemented in any of a number of well-known techniques, including implementation by means of a suitable set of program instructions stored on a computer readable storage medium (e.g., various types of magnetic and optical storage media) for controlling a general purpose processor, as well as by means of specially designed dedicated hardware components. Any and all of such embodiments, and combinations thereof, are intended to be included within the scope of the following figures and discussion.

Figure 4:
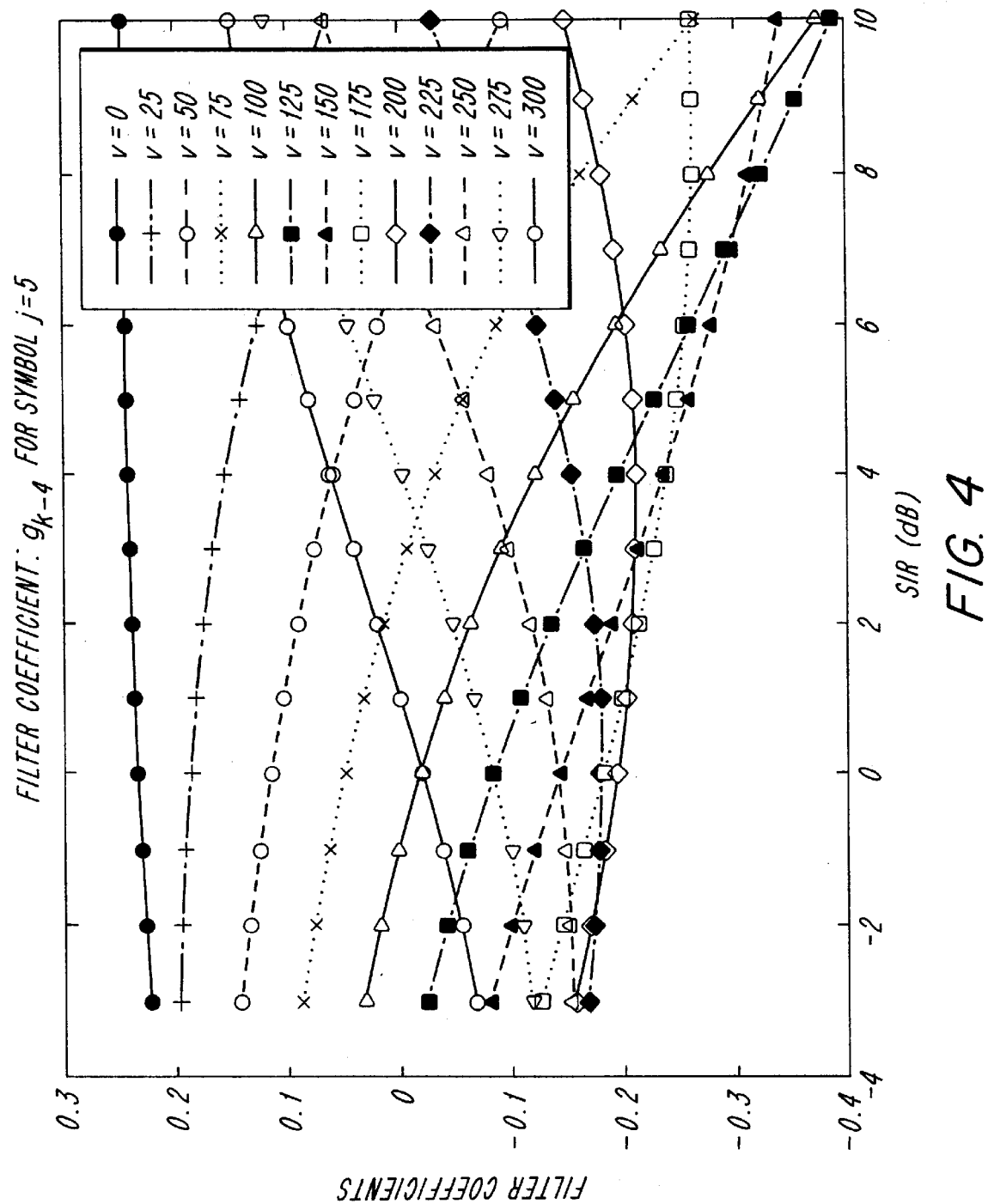
FIG. 4 is a graph depicting filter coefficients $[g_{k-m}, \ldots, g_{k-1}, g_k]$ in $G_j$ for a symbol j in slot $k-n_B$ over varying Signal to Interference Rations and velocity values.

As can be seen from Eq. (6), the filter, $G_j$, is characterized by $(m, n_B)$, where m is the number of primary channel estimates that are used and $n_B$ is the number of slots that are buffered. It is desired to avoid the computational load (mainly the matrix inversion) that the straightforward calculations in Eq. (12) require. One issue that determines the demanding load on the computations is the need to update, for each slot, the filter coefficients $G_j$ used in Eq. (6). This in turn is based on the need to use those paths in the RAKE receiver having the highest SIR for each slot. For symbol j in slot $k-n_B$, corresponding filter coefficients $[g_{k-m}, \ldots, g_{k-1}, g_k]$ in $G_j$ have been determined over varying SIR and velocity (v) values (measured in kilometers per hour) in a Rayleigh fading channel, with the results being plotted in the graph of FIG. 4. The analysis shows that the values of the individual filter coefficients vary much more for $f_d$ variations than for SIR variations.

Therefore, in accordance with one aspect of the invention, the filter coefficients used in Eq. (6) are approximated by $\hat{g}_x$ given by $$\hat{g}_x = \alpha(x, f_d)_N SIR^N + \alpha(x, f_d)_{N-1} SIR^{N-1} \ldots + \alpha(x, f_d)_0 \quad (18)$$

where $k-m \leq x \leq k$. The polynomial $\hat{g}_x$ is of degree N and fits the data $\hat{g}_x = g_x$, in a least-squares sense. Those having ordinary skill in the art will readily understand how to determine such a polynomial approximation. The degree N of the polynomial should be chosen with respect to performance and implementation aspects. However, both the number of primary channel estimates m and the degree N of the polynomial can also be functions of the Doppler frequency, $f_d$, and the SIR estimations. Considering that the Doppler frequency $f_d$ could be assigned any value, the polynomial coefficients $\alpha(x,\hat{f}_d(\lambda))_\eta$, where $N \leq \eta \leq 0$, are only valid for a limited number of $\hat{f}_d(\lambda)$ given by $$\hat{f}_d(0) \text{ when } f_d(v_0) \leq f_d \leq f_d(v_1) \hat{f}_d(\lambda) = \ldots \hat{f}_d(q) \text{ when } f_d(v_{2q}) \leq f_d \leq f_d(v_{2q+1}) \quad (19)$$

where $0 \leq \lambda \leq q$ and $f_d(v_\phi)$ where $0 \leq \phi \leq 2q+1$, is the Doppler frequency for corresponding velocity $v_\phi$. The number of quantization levels, q, and the uniform or non-uniform distributed quantization intervals should be chosen with respect to performance and implementation aspects.

Figure 3:
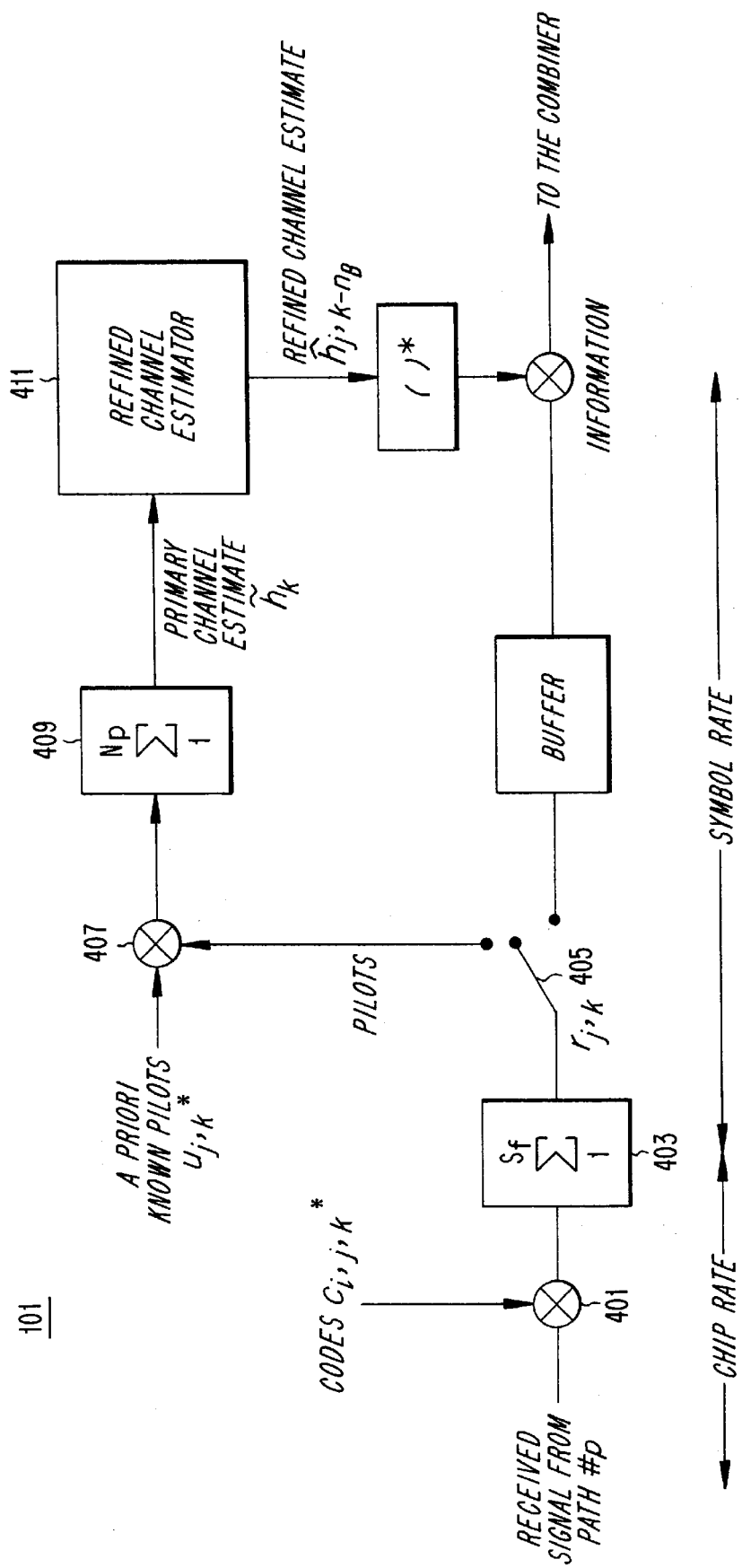
FIG. 3 is a block diagram of an exemplary RAKE finger of a RAKE receiver.
Figure 5:
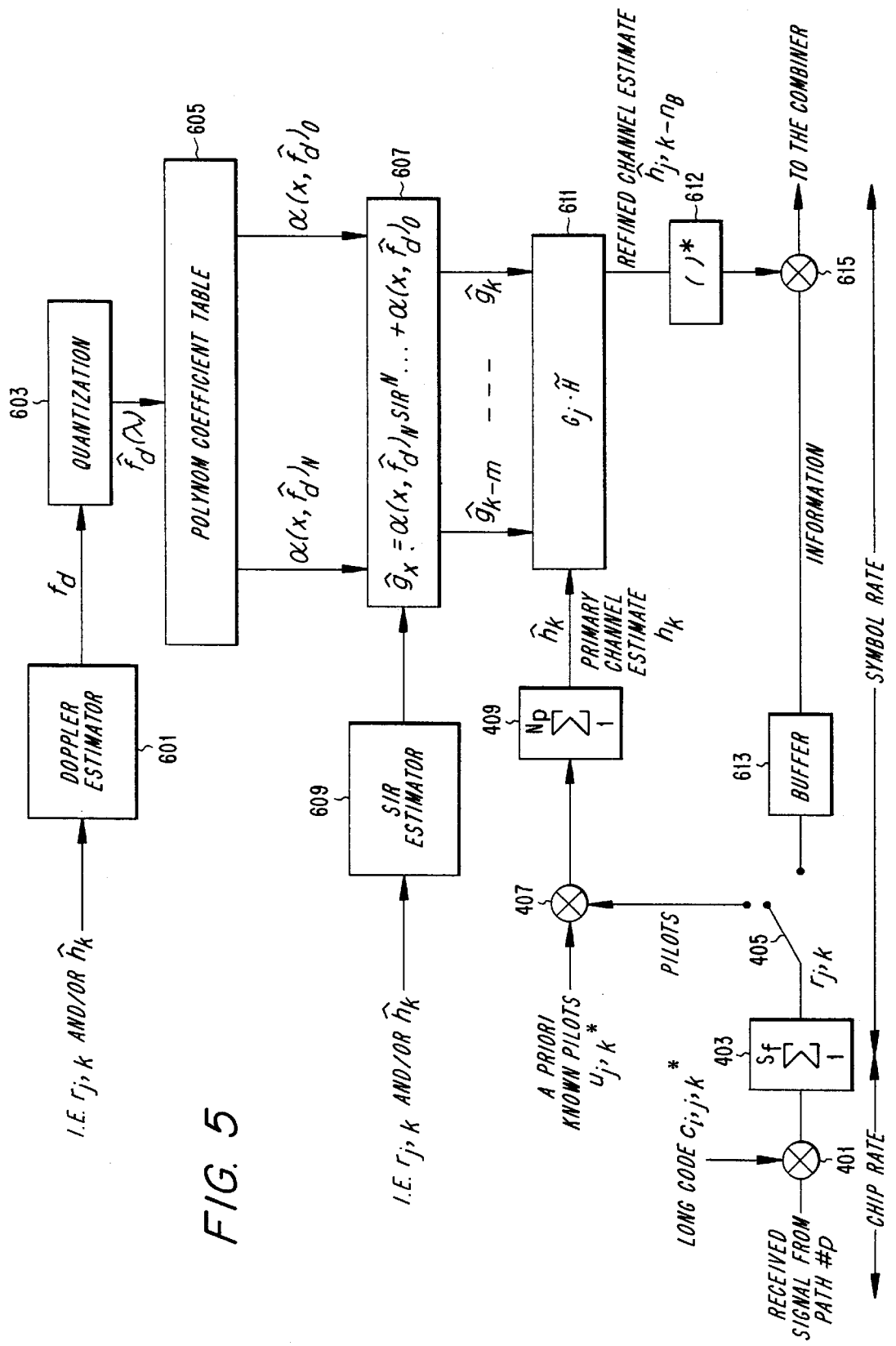
FIG. 5 is a block diagram of a RAKE finger that includes an exemplary channel estimator in accordance with one aspect of the invention.

A block diagram of a RAKE finger that includes an exemplary channel estimator in accordance with this aspect of the invention is depicted in FIG. 5. The first multiplier 401, first integration device 403, switch 405, second multiplier 407 and second integration device 409 operate as described above with respect to FIG. 3, so that discussion of these elements need not be repeated here. In order to generate the channel estimate, a Doppler estimator 601 is provided, which uses known techniques to determine the Doppler frequency based on the received signal $r_{j,k}$ and/or the primary channel estimate $\hat{h}_k$. The Doppler frequency, $f_d$ is then supplied to a quantization device 603, whose operation is described by Eq. (19). The quantized Doppler frequency, $\hat{f}_d(\lambda)$, is then supplied for use as at least part of an address to a polynomial coefficient table 605, which generates at its output N+1 coefficients, $\alpha(x,\hat{f}_d)_N, \ldots \alpha(x,\hat{f}_d)_0$, that are supplied to a polynomial approximation unit 607. In addition to the part of the address derived from the quantized Doppler frequency, $\hat{f}_d(\lambda)$, the address is preferably further derived from an indicator of which one of the approximated filter coefficients is to be generated and further from the index, j, which identifies which symbol the refined channel estimate is for.

A SIR estimator 609 is also provided for generating an estimate of the SIR based on the received signal, $r_{j,k}$ and/or the primary channel estimate, $\hat{h}_k$. The SIR estimator 609 operates in accordance with well-known techniques, and need not be described here in detail. The estimated SIR value is supplied to the polynomial approximation unit 607.

The polynomial approximation unit 607 operates in accordance with Eq. (18) to generate the approximated filter coefficients $\hat{g}_{k-m}, \ldots \hat{g}_k$ which are supplied to a refined channel estimator filter 611. The refined channel estimator filter 611 also receives the primary channel estimate $\hat{h}_k$ from the second integration device 409, and operates in accordance Eq. (6) to generate the channel estimate $\hat{h}_{j,k-n_B}$ that, after being turned into its complex conjugate 612, is used to multiply (e.g., with multiplier 615) the received signal information (that has been stored in a buffer 613) in order to compensate for the channel corruption before combination with the compensated signal information from other RAKE fingers.

As an alternative to the quantization of Doppler frequency $f_d$ and the subsequent table look-up operations, the polynomial coefficients $\alpha(x,f_d)_\eta$ can themselves be approximated by a second polynomial:

$$\alpha(x,f_d)_\eta = \beta(x,j)_z f_d^z + \beta(x,j)_{z-1} f_d^{z-1} \ldots + \beta(x,j)_0 \quad (20)$$

where $\alpha(x,f_d)_\eta$ is a polynomial of degree z that fits the data, $\alpha(x,f_d)_{\eta-\alpha(x,f_d)_\eta}$, in a least-squares sense. Those having ordinary skill in the art will readily understand how to determine such a polynomial approximation. The degree z of the polynomial should then be chosen with respect to performance and implementation aspects.

Figure 6:
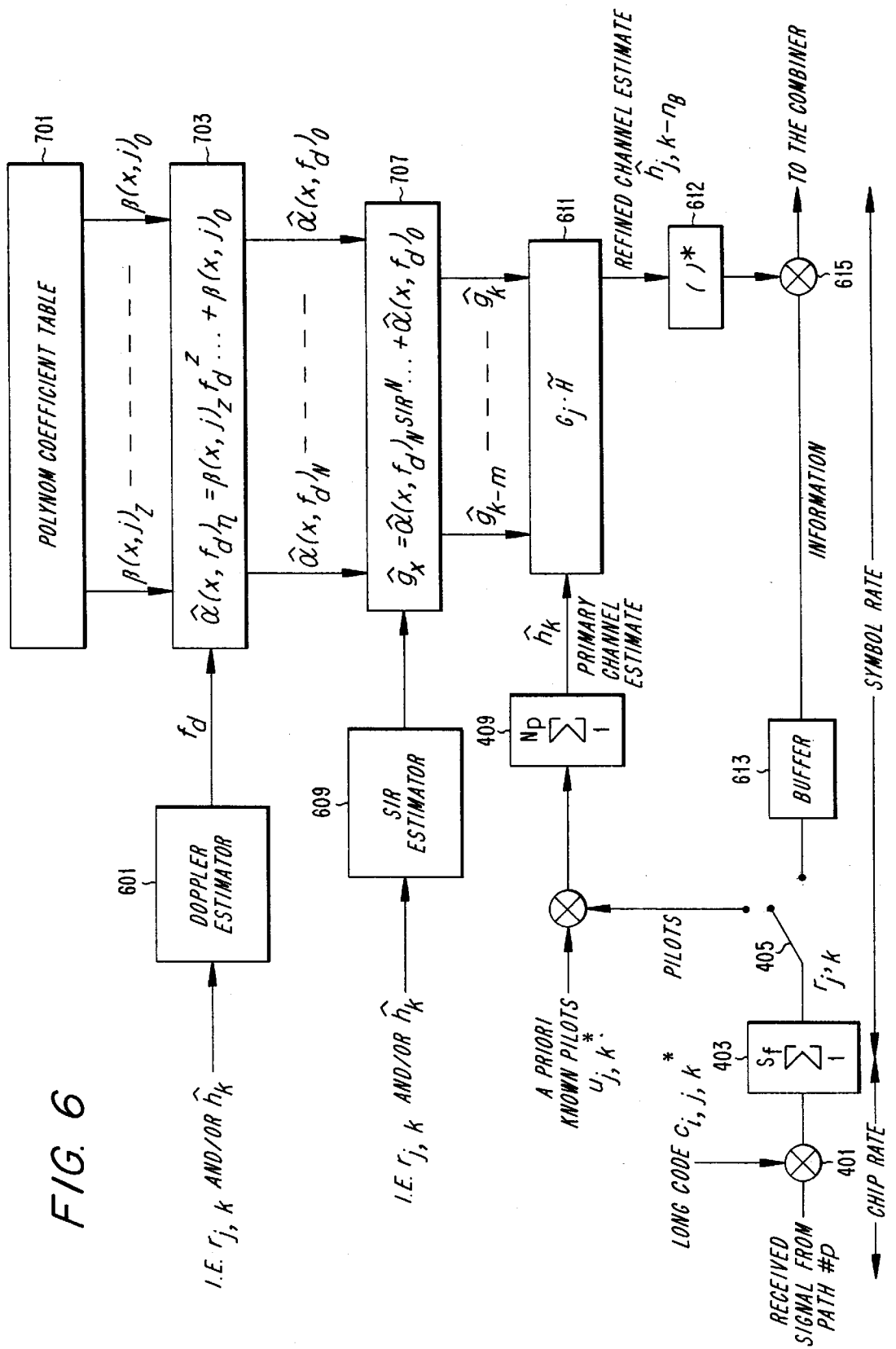
FIG. 6 is a block diagram of an alternative embodiment of a RAKE finger that includes an exemplary channel estimator in accordance with one aspect of the invention.

A block diagram of this alternative embodiment is depicted in FIG. 6. The first multiplier 401, first integration device 403, switch 405, second multiplier 407, second integration device 409, Doppler estimator 601, SIR estimator 609, polynomial approximation unit 607, refined channel estimator filter 611 and multiplier 615 operate as described above with respect to FIG. 5, so that discussion need not be repeated here. In place of the quantization device 603 and polynomial coefficient table 605 depicted in FIG. 5, this alternative embodiment utilizes a polynomial coefficient table 701 and a coefficient generator 703. The polynomial coefficient table 701 has stored therein the coefficients $\beta(x,j)_z, \ldots \beta(x,j)_0$ that are supplied to the coefficient generator 703. An address into the polynomial coefficient table 701 is preferably derived from an indicator of which one of the approximated filter coefficients is to be generated and further from the index, j, which identifies which symbol the refined channel estimate is for.

The coefficient generator 703 also receives the estimated Doppler frequency, $f_d$, from the Doppler estimator 601, and operates in accordance with Eq. (20) to generate the estimated coefficients $\alpha(x,f_d)_N, \ldots \alpha(x,f_d)_0$, which are supplied to the polynomial approximation unit 607. The remainder of the equalization process is as described above with respect to FIG. 5.

In other alternative embodiments of the invention, one or more of the above-described approximations of the MMSE based channel estimation can also be used for non-spread spectrum Multiple Access (MA) systems that use an equalizer. Similar to Eq. (3), the received signal in a non-spread spectrum MA system can be described as $$r_{j,k} = \sum_{i=0}^{L-1} u_{j-\tau_i,k} \cdot h_{i,j,k} + \tilde{n}_{j,k}, \quad (21)$$

(see, e.g., J. G. Proakis, *Digital Communications*, McGraw-Hill, 1983) where $h_{i,j,k}$ is the channel for symbol j in a slot k for the different time delays $\tau_j$ and $0 \leq i \leq L-1$. The symbol $u_{j,k}$ is the transmitted symbol $j-\tau_i$ in a slot k. Similar to Eq. (5), L primary channel estimates are made for each slot. Correspondingly, $\hat{h}_{j,k-n_B}$ in Eq. (6) becomes a vector $\hat{H}_{j,k-n_B}$ of length L for this case. Likewise, $G_j$ becomes a matrix of size k×L, $\overline{H}$ becomes a matrix of size L×k, and $\hat{h}_k$ becomes a vector $\hat{H}_k$ of length L. With this generalization, the calculations described above with respect to Eqs. (3) through (27) are also valid for the non-spread spectrum system model described in Eq. (21).

Figure 7:
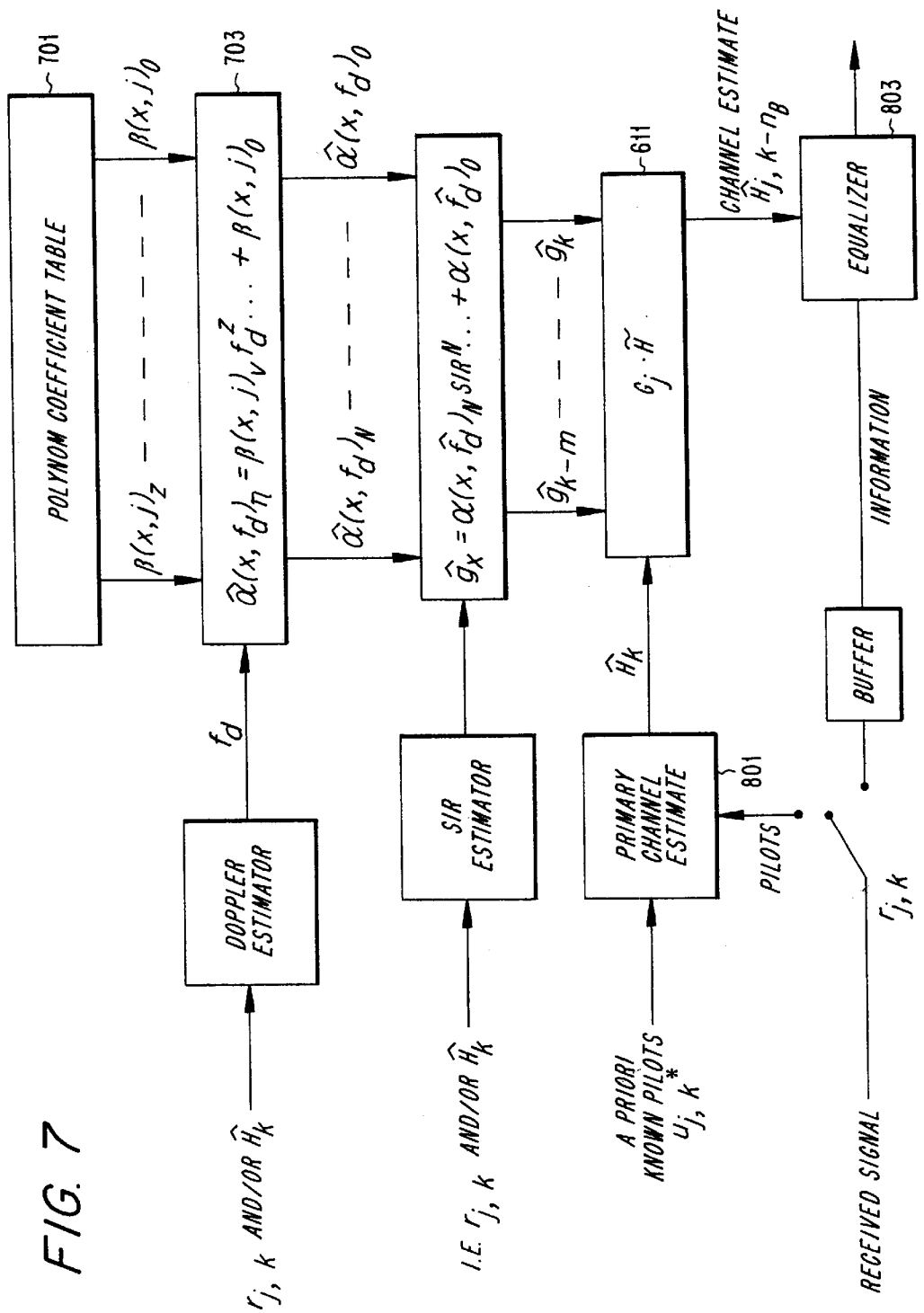
FIG. 7 is a block diagram of yet another alternative embodiment of an approximative MMSE channel estimator for a non-spread MA system that uses an equalizer in accordance with one aspect of the invention.

An exemplary embodiment of an approximative MMSE channel estimator for a non-spread MA system that uses an equalizer is depicted in FIG. 7. Except for necessary differences in the primary channel estimator 801 and in the equalizer 803 that arise from the fact that this is a non-spread MA system, this embodiment is similar to the one depicted in FIG. 6 in that polynomials are used not only to approximate the filter coefficients $[g_{k-m}, \ldots, g_{k-1}, g_k]$ used by the refined channel estimator filter 611, but also in that the coefficients for this polynomial approximation are themselves determined by a polynomial approximation in the coefficient generator 703. Of course, in still other alternative embodiments, the coefficient generator 703 and polynomial coefficient table 701 could be replaced by a quantization device 603 and polynomial coefficient table 605 in the manner depicted in FIG. 5.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of determining a communications channel estimate in a receiver, comprising the steps of:
   using a polynomial expression to determine a set of approximated filter coefficients;
   using the approximated filter coefficients to determine the communications channel estimate;
   determining polynomial coefficients for the polynomial expression by supplying an address to a polynomial coefficient table having stored therein at least one set of polynomial coefficients; and
   using the polynomial coefficients supplied at an output of the polynomial coefficient table as the polynomial coefficients for the polynomial expression.

2. The method of claim 1, further comprising the step of deriving the address at least in part from a Doppler frequency value of a received signal.

3. The method of claim 2, wherein the step of deriving the address from the Doppler frequency value of a received signal comprises the steps of:
   quantizing the Doppler frequency value; and
   using the quantized Doppler frequency value as the address.

4. A method of determining a communications channel estimate in a receiver, comprising the steps of:
   using a polynomial expression to determine a set of approximated filter coefficients;
   using the approximated filter coefficients to determine the communications channel estimate;
   determining polynomial coefficients for the polynomial expression by using a second polynomial expression to determine a set of approximated polynomial coefficients; and
   using the approximated polynomial coefficients as part of the polynomial expression that is used to determine the set of approximated filter coefficients.

5. A method of determining a communications channel estimate in a receiver, comprising the steps of:
   using a polynomial expression to determine a set of approximated filter coefficients; and
   using the approximated filter coefficients to determine the communications channel estimate,
   wherein the degree of the polynomial expression is a function of a Doppler frequency of the received signal.

6. A method of determining a communications channel estimate in a receiver, comprising the steps of:
   using a polynomial expression to determine a set of approximated filter coefficients; and
   using the approximated filter coefficients to determine the communications channel estimate,
   wherein the degree of the polynomial expression is a function of a signal to interference ratio estimation of the received signal.

7. A method of determining a communications channel estimate in a receiver, comprising the steps of:
   using a polynomial expression to determine a set of approximated filter coefficients; and
   using the approximated filter coefficients to determine the communications channel estimate,
   wherein the set of approximated filter coefficients includes a number, m, of approximated filter coefficients, where m is a function of a Doppler frequency of the received signal.

8. A method of determining a communications channel estimate in a receiver, comprising the steps of:
   using a polynomial expression to determine a set of approximated filter coefficients; and
   using the approximated filter coefficients to determine the communications channel estimate,
   wherein the set of approximated filter coefficients includes a number, m, of approximated filter coefficients, where m is a function of a signal to interference ratio estimation of the received signal.

9. An apparatus for determining a communications channel estimate in a receiver, comprising:
   means for using a polynomial expression to determine a set of approximated filter coefficients;
   means for using the approximated filter coefficients to determine the communications channel estimate; and
   means for determining polynomial coefficients for the polynomial expression, said means for determining polynomial coefficients comprising:
      a polynomial coefficient table having stored therein at least one set of polynomial coefficients;
      means for supplying an address to the polynomial coefficient table; and
      means for using the polynomial coefficients supplied at an output of the polynomial coefficient table as the polynomial coefficients for the polynomial expression.

10. The apparatus of claim 9, further comprising means for deriving the address at least in part from a Doppler frequency value of a received signal.

11. The apparatus of claim 10, wherein the means for deriving the address from the Doppler frequency value of a received signal comprises:
    means for quantizing the Doppler frequency value; and
    means for using the quantized Doppler frequency value as the address.

12. An apparatus for determining a communications channel estimate in a receiver, comprising:
    means for using a polynomial expression to determine a set of approximated filter coefficients;
    means for using the approximated filter coefficients to determine the communications channel estimate;
    means for determining polynomial coefficients for the polynomial expression by using a second polynomial expression to determine a set of approximated polynomial coefficients; and
    means for using the approximated polynomial coefficients as part of the polynomial expression that is used to determine the set of approximated filter coefficients.

13. An apparatus for determining a communications channel estimate in a receiver, comprising:
    means for using a polynomial expression to determine a set of approximated filter coefficients; and
    means for using the approximated filter coefficients to determine the communications channel estimate,
    wherein the degree of the polynomial expression is a function of a Doppler frequency of the received signal.

14. An apparatus for determining a communications channel estimate in a receiver, comprising:

means for using a polynomial expression to determine a set of approximated filter coefficients; and means for using the approximated filter coefficients to determine the communications channel estimate, wherein the degree of the polynomial expression is a function of a signal to interference ratio estimation of the received signal.

15. An apparatus for determining a communications channel estimate in a receiver, comprising:

means for using a polynomial expression to determine a set of approximated filter coefficients; and means for using the approximated filter coefficients to determine the communications channel estimate, wherein the set of approximated filter coefficients includes a number, m, of approximated filter coefficients, where m is a function of a Doppler frequency of the received signal.

16. An apparatus for determining a communications channel estimate in a receiver, comprising:

means for using a polynomial expression to determine a set of approximated filter coefficients; and means for using the approximated filter coefficients to determine the communications channel estimate, wherein the set of approximated filter coefficients includes a number, m, of approximated filter coefficients, where m is a function of a signal to interference ratio estimation of the received signal.

* * * * *